UNITED STATES PATENT OFFICE.

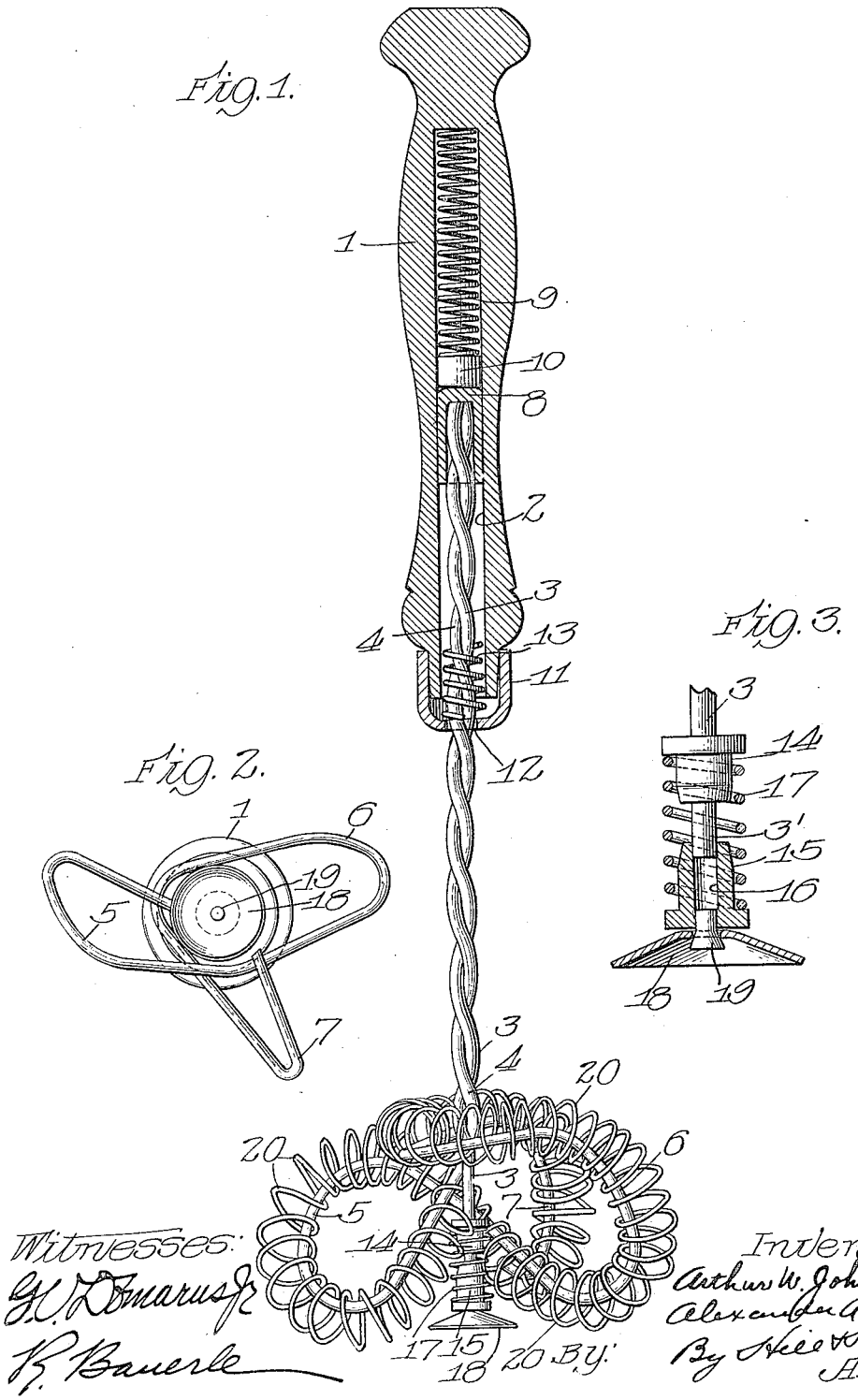

ARTHUR W. JOHNSTON AND ALEXANDER A. NORTON, OF CHICAGO, ILLINOIS.

EGG-BEATER OR THE LIKE.

1,140,341. Specification of Letters Patent. Patented May 18, 1915.

Application filed January 20, 1913. Serial No. 743,080.

*To all whom it may concern:*

Be it known that we, ARTHUR W. JOHNSTON and ALEXANDER A. NORTON, citizens of the United States, residing at Chicago, in the county of Cook and State of Illinois, have invented certain new and useful Improvements in Egg-Beaters or the like, of which the following is a description.

Our invention belongs to that general class of devices commonly known as egg beaters for beating eggs, or whipping cream or other material.

The invention has among its objects the production of a device of the kind described that is simple, convenient, durable, efficient, and satisfactory, and that may be manufactured at comparatively small cost.

To this end our invention consists in the novel construction, arrangement and combination of parts herein shown and described, and more particularly pointed out in the claims.

In the drawings, wherein like reference characters indicate like or corresponding parts, Figure 1 is a partial sectional and partial side elevation of the preferred form of device. Fig. 2 is a lower end elevation of the same with the coiled members 20 removed, and Fig. 3 is an enlarged sectional view of the lower end of the device.

Referring to the drawings, 1 represents a suitable handle of any desired material having a chamber 2 therein for the reception of the wires 3 and 4, which are twisted to form a shank or shaft. One of the wires, as shown 4, is bent or formed as at 5, 6, 7, at its lower end, as more fully explained hereafter. The other wire 3 is provided with a suitable foot, as is also described more in detail hereafter.

Within the chamber 2 in the handle is arranged a spring 9, which tends to normally force the shaft or shank from the handle. The shaft is provided with an end 8 and the spring with an end 10, which serve to center the shaft and spring. A ferrule or end 11 is placed upon the end of the handle, the same being provided with an opening 12, through which the shaft extends. The opening 12 is preferably bifurcated, or formed to correspond with the cross section through the shaft, so that as the shaft is forced out by the spring 9, or the handle depressed to force the shaft in the handle, the shaft is caused to rotate, thereby driving the loop end 5, 6 and 7. If desired, a spring 13 may be arranged as shown, so as to make the device more resilient or yielding, as well as more nearly noiseless in operation, as when the handle is raised sufficiently it brings the end 8 into contact with the spring instead of the ferrule 11.

As most clearly shown in Fig. 3, the end 3' of the wire 3 is provided with a collar 14. To this collar is secured an adjustable collar 15, the same being connected to the collar 14 by a spring or resilient member 17. It will be noted that the collar or end 15 is provided with an opening 16, so as to permit movement of the part 15. Secured to the part 15 is a cup or disk member 18, the same being pivotally secured to the part 15 by a rivet 19, or its equivalent.

It will be noted by referring particularly to Figs. 1 and 2, that the loops 5, 6 and 7 are substantially offset at the top relative the lower side of the loop, so as to form loops somewhat similar to a fan or propeller blades. Arranged on the loops is a coiled spring member 20. In using the device, assuming that the disk 18 is upon the bottom of a suitable vessel or receptacle, when the handle 1 is depressed, the shaft 3, 4 and the loops 5, 6 and 7, and coils 20, are rotated, assuming, of course, that the handle is held and prevented from rotating. It will be noted that the loops and coil 20 have a vertical movement, owing to the resilient connection between the end 3' of the wire 3 and the disk 18, as well as a rotating movement. The coil 20 permits the beaters to reach to the bottom of the receptacle and substantially cushion the same thereon, as well as on the sides of the vessel, should the vessel be small or the beater operated near the side wall. The cutting or beating of the material is, of course, increased with the increase of the coils 20. When the handle is raised the spring 9 forces the shaft or shank down, rotating the same in the opposite direction. At this time the action of the loops and coils thereon is in the opposite direction to that previously described, and owing to the offset, there is a different cutting to that which took place when the loops were rotated in the opposite direction. The beating, as is obvious, is continued by raising and lowering the handle 1 until the material is beaten sufficiently for the purpose desired.

Having thus described our invention, it is obvious that various immaterial modifications may be made in the same without de- parting from the spirit of our invention, hence we do not wish to be understood as limiting ourselves to the exact form, construction, arrangement and combination of parts herein shown and described, or uses mentioned.

What we claim as new and desire to secure by Letters Patent is:—

1. In a device of the kind described and in combination, a suitable handle, a shaft rotatably secured therein, said shaft comprising a pair of twisted wires, one wire bent at its lower end about the shaft to form a plurality of loops, extending transversely and parallel with the shaft, with the upper parts offset relative the lower parts, a coiled wire cutter carried by said loops, a cap slidably mounted upon the free end of one of said shaft wires, a resilient support between said cap and said wire, and a foot piece loosely connected to said cap.

2. In a device of the kind described and in combination, a suitable handle, a shaft rotatably secured therein, and comprising a plurality of wires twisted about each other, one wire bent at its lower end to form a plurality of loops about the shaft, the other wire extended parallel with the shaft and provided with a collar thereon proximate the end, a cap slidably mounted upon the free end of said wire, a spring arranged between said cap and collar and secured thereto, and a foot piece pivotally secured to said cap.

3. In a device of the kind described and in combination, a hollow handle, a shaft rotatably secured therein, and comprising a plurality of wires twisted about each other, one wire terminating at its lower end in a straight portion and the other at its lower end terminating in a plurality of substantially U-shaped loop portions extending transversely relative to the shaft with opposite arms offset vertically, a tubular cap member having a slidable connection with the lower straight portion of said shaft wire, a spring interposed between said cap and said shaft wire, and a disk supported upon said cap.

In testimony whereof, we have hereunto signed our names in the presence of two subscribing witnesses.

ARTHUR W. JOHNSTON.
ALEXANDER A. NORTON.

Witnesses:
Roy W. Hill,
Charles I. Cobb.